US008347217B2

(12) United States Patent
Brillhart et al.

(10) Patent No.: US 8,347,217 B2
(45) Date of Patent: Jan. 1, 2013

(54) CUSTOMIZED RULE APPLICATION AS FUNCTION OF AVATAR DATA

(75) Inventors: David C. Brillhart, Orlando, FL (US); Christopher J. Dawson, Herndon, VA (US); Michael D. Kendzierski, New York, NY (US); James W. Seaman, II, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/629,160

(22) Filed: Dec. 2, 2009

(65) Prior Publication Data

US 2011/0131509 A1    Jun. 2, 2011

(51) Int. Cl.
G06F 3/048    (2006.01)
G06F 3/00    (2006.01)

(52) U.S. Cl. ......................................... 715/757; 715/745
(58) Field of Classification Search .................. 715/745, 715/757; 709/224
See application file for complete search history.

(56) References Cited

U.S. PATENT DOCUMENTS

| 6,014,657 | A | 1/2000 | Weida et al. |
| 6,108,670 | A | 8/2000 | Weida et al. |
| 6,154,849 | A | 11/2000 | Xia |
| 6,377,263 | B1 | 4/2002 | Falacara et al. |
| 2006/0184355 | A1* | 8/2006 | Ballin et al. ...................... 704/8 |
| 2007/0191100 | A1* | 8/2007 | Counts .............................. 463/42 |
| 2009/0079816 | A1* | 3/2009 | Qvarfordt et al. ........... 348/14.16 |
| 2009/0113040 | A1* | 4/2009 | Zalewski ....................... 709/224 |
| 2009/0164403 | A1* | 6/2009 | Jung et al. ........................ 706/46 |
| 2009/0174702 | A1* | 7/2009 | Garbow et al. ............... 345/419 |
| 2009/0177979 | A1* | 7/2009 | Garbow et al. ............... 715/757 |
| 2009/0210803 | A1* | 8/2009 | Brignull et al. ............... 715/757 |
| 2010/0081508 | A1* | 4/2010 | Bhogal et al. ................... 463/40 |

OTHER PUBLICATIONS

U.S. Patent Application of Brillhart et al entitled Application of Normative Rules in a Virtual Universe, U.S. Appl. No. 12/500,894, filed Jul. 10, 2009, and assigned to IBM.

* cited by examiner

*Primary Examiner* — Rashawn Tillery
(74) *Attorney, Agent, or Firm* — Patrick J. Daugherty; Driggs, Hogg, Daugherty & Del Zoppo Co., LPA

(57) ABSTRACT

Methods, services, articles of manufacture comprising computer readable programs, systems, articles and programmable devices are provided for customizing an avatar behavior rule within a virtual universe environment as a function of individual avatar data. It is determined whether the activity of an avatar is relevant to a behavior rule for a virtual universe. If the activity is determined to be relevant to the rule, the rule is customized for the avatar as a function of individual avatar data associated with the avatar, and it is determined whether the activity exceeds a violation threshold of the customized rule. If the activity is determined to exceed the customized rule violation threshold, an appropriate action is taken as specified by the customized rule.

15 Claims, 2 Drawing Sheets

CUSTOMIZED RULE APPLICATION AS FUNCTION OF AVATAR DATA

FIELD OF THE INVENTION

The present invention generally relates to individually customizing normative rules in a virtual universe domain in response to individual avatar behavior and data.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any two or three dimensional graphic image or rendering may be utilized. In order to participate within or inhabit a VU a user creates an agent which functions as the user's account, and upon which the user builds an avatar tied to an inventory of assets the user owns in the VU and associated with the agent.

Many VU's are represented using three dimensional (3-D) graphics and landscapes and are populated by many thousands of users or "residents," wherein the VU often resembles a real world or a fantasy/fictional world in terms of physics, houses, landscapes and in interpersonal communications with other user avatars. VU environments generally comprise a variety of man-made or computer application-generated artifacts, in one aspect representative of items and artifacts understood and recognized by users through their experiences in the real world as well as through fictional experiences. Real property artifacts may include realistic walkways and streets, buildings (stores, offices, etc.), parks, plazas, atriums, as well as fantasy environments such as other planets or worlds of fictional literature and the arts. Personal property artifacts include a wide variety of items such as real-world motorcycles, tokens or clothing, as well as fantasy world potions, spacesuits, etc. Moreover, avatar artifacts representing users or automated applications (for example, an automaton greeter programmed to request user information inputs) may comprise a wide variety of visual and behavioral attributes, evidencing real-life human-like appearances and behaviors as well as fantastical powers or character appearances.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life. A VU may also be defined with respect to multiple VU regions, virtual areas of land within the VU often residing on a single server, with each region amenable to provision and management by a one or more participating providers. The size and complexity and variety of resources found in a VU may be directly related to a number of providers participating and hosting regions through server hosting, and the success of a VU may depend upon attracting users and keeping them engaged and participating in the VU environment, thereby adding value to the providers who bear the cost in providing VU region content and services and who may correspondingly expect an appropriate level of multiple-user engagement as a return on their investment, as well as for other users who wish to engage many others in a large virtual community. For example an informational or service-related region managed by a governmental or non-profit organization may desire or expect a given level of VU user engagement and participation, and commercial region providers may desire to engage in a given level of commercial transactions (e.g. number of sales, advertising exposures or paying subscribers) or achieve a level of marketing exposure among VU users.

SUMMARY OF THE INVENTION

The present invention teaches methods for customizing an avatar behavior rule within a virtual universe environment as a function of individual avatar data. It is determined whether an activity of an avatar within a virtual universe is relevant to a behavior rule for the virtual universe. If the activity is determined to be relevant to the rule, the rule is customized for the avatar as a function of individual avatar data associated with the avatar, and it is determined whether the activity exceeds a violation threshold of the customized rule. If the activity is determined to exceed the customized rule violation threshold, an appropriate action is taken as specified by the customized rule. Moreover, the individual avatar data is updated as a function of determining whether the activity is relevant to a rule, customizing a rule, determining whether the activity exceeds a customized rule violation threshold and/or taking an appropriate action.

In another aspect, service methods are provided, for example by a service provider who offers to implement, deploy, and/or perform functions for others. An exemplary service for customizing an avatar behavior rule within a virtual universe environment as a function of individual avatar data includes deploying a computational device infrastructure that is configured to determine whether an activity of an avatar within a virtual universe is relevant to a behavior rule for the virtual universe. If the activity is relevant to the rule, the rule is customized for the avatar as a function of individual avatar data associated with the avatar, and it is determined whether the activity exceeds a violation threshold of the customized rule. If the activity exceeds the customized rule violation threshold, an appropriate action is taken specified by the customized rule. Lastly, the individual avatar data is updated as a function of determining whether the activity is relevant to the rule, customizing the rule, determining whether the activity exceeds the customized rule violation threshold and/or taking the appropriate action.

Still further, articles of manufacture comprising a computer usable medium having a computer readable program in said medium are provided. Such program code comprises instructions which, when executed on a computer system, cause the computer system to determine whether an activity of an avatar within a virtual universe is relevant to a behavior rule for the virtual universe. If the activity is determined to be relevant to the rule, the rule is customized for the avatar as a function of individual avatar data associated with the avatar and it is determined whether the activity exceeds a violation threshold of the customized rule. If the activity is determined to exceed the customized rule violation threshold, an appropriate action is taken specified by the customized rule. Lastly, the individual avatar data is updated as a function of the determining whether the activity is relevant to the rule, the customizing the rule, the determining whether the activity exceeds the customized rule violation threshold and/or taking the appropriate action.

Moreover, systems, articles and programmable devices configured for performing one or more method and/or process elements of the current invention are also provided for customizing an avatar behavior rule within a virtual universe environment as a function of individual avatar data. In one example a programmable device includes a processing means, memory and a network interface in communication with a virtual universe environment. The processing means is configured to determine whether an activity of an avatar within a virtual universe is relevant to a behavior rule for the virtual universe. If the activity is determined to be relevant to the rule, the rule is customized for the avatar as a function of individual avatar data associated with the avatar and it is determined whether the activity exceeds a violation threshold of the customized rule. If the activity is determined to exceed the customized rule violation threshold, an appropriate action specified by the customized rule is taken. Lastly, the individual avatar data is updated as a function of the determining whether the activity is relevant to the rule, the customizing the rule, the determining whether the activity exceeds the customized rule violation threshold and/or taking the appropriate action.

BRIEF DESCRIPTION OF THE DRAWINGS

These and other features of this invention will be more readily understood from the following detailed description of the various aspects of the invention taken in conjunction with the accompanying drawings in which.

Figure 1:
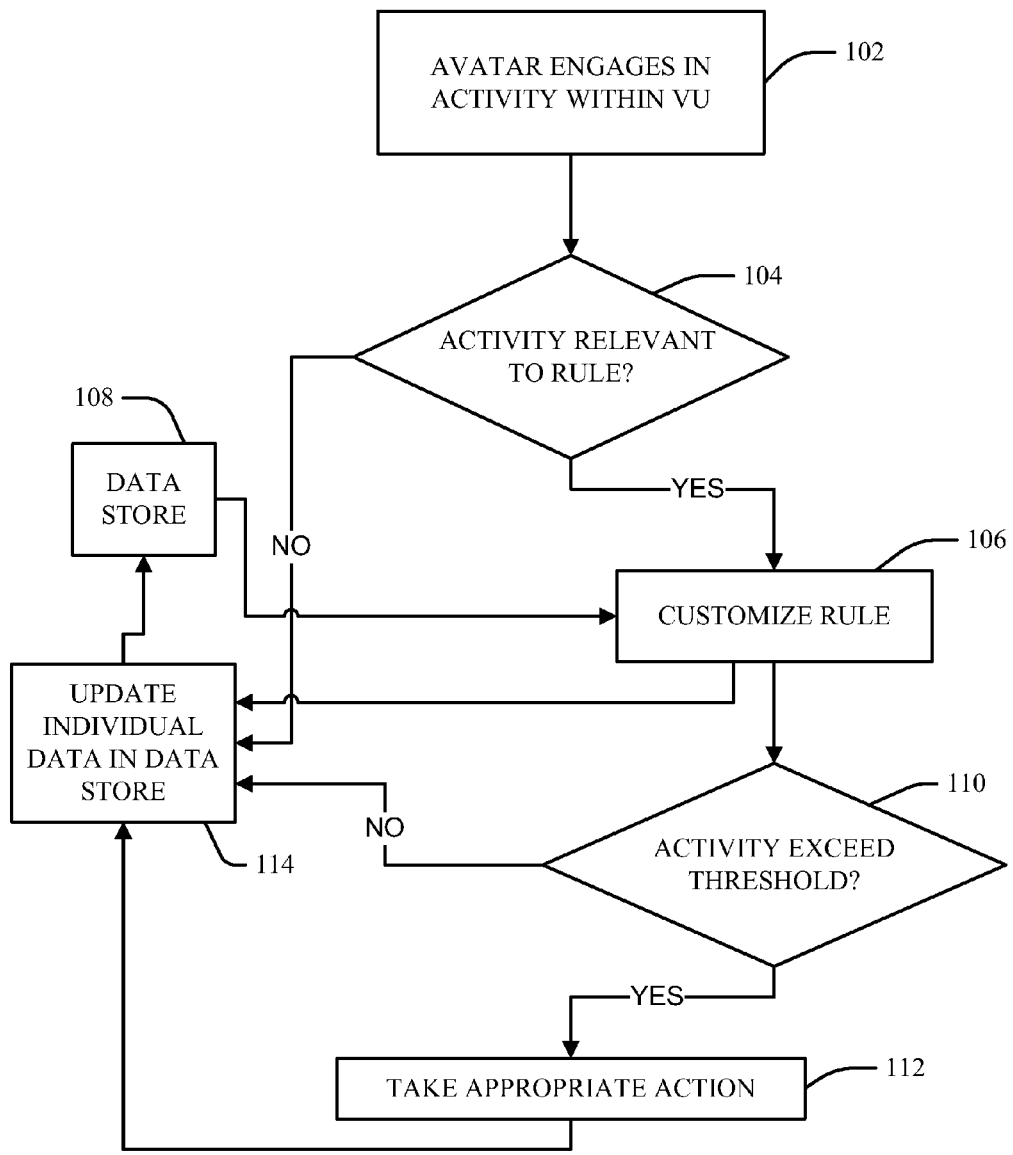
FIG. 1 is a flow chart illustrating customizing an avatar behavior rule within a virtual universe environment as a function of individual avatar data according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
I. General Description
II. Computerized Implementation
I. General Description Within a virtual world it is often necessary to govern and manage the behaviors of avatars, in one aspect in order to prevent offensive, threatening or dangerous actions or those otherwise violating a norm of the VU or the expectations of other VU residents or users. Some avatars or activities may discourage other users from engaging in or continuing to participate in a given VU, in some examples resulting in a direct loss of opportunities to provide services, advertising, revenue opportunities, etc. However, if the desire to control the actions of virtual universe residents by defining and enforcing rules and regulations within a virtual world is not balanced with the desires and needs of individual avatar users the experience of said users may be unacceptable. If rules or actions associated with their infraction are/is perceived as too stringent, arbitrary, unfair, inflexible or otherwise objectionable, users may decline to engage the VU, resulting in the direct loss of their participation, as well as of others indirectly who may be influenced by objecting residents.

Referring now to FIG. 1, a method and process for customizing an avatar behavior rule within a virtual universe (VU) environment as a function of individual avatar data according to the present invention is provided. With respect to an activity or behavior of an avatar within a virtual universe at 102 it is determined at 104 whether the activity is relevant to a behavior rule for the virtual universe environment. If the activity is determined to be relevant to the rule, then at 106 the rule is customized for the avatar as a function of his or her individual avatar data associated with the avatar and retrieved from a data store 108, and at 110 it is determined whether the activity exceeds a violation threshold of the customized rule. If the activity is determined to exceed the customized rule violation threshold, then at 112 an appropriate action specified by the customized rule is taken. The data store 108 individual avatar data is updated at 114, for example as a function of the determining whether the activity is relevant to the rule at 104, the customizing the rule at 106, the determining whether the activity exceeds the customized rule violation threshold at 110 and the taking the appropriate action at 112. Event data is thus created for each activity observed and relevant to the rule, threshold, etc., including both compliant and violating actions and behaviors, and the event data is used to update a behavior history or other individual data of the avatar stored in the memory or other storage means 108 for subsequent rule customizations at 106.

The present invention provides for the dynamic customization and adaptation of VU behavior rules, including customizing thresholds for triggering appropriate actions for an individual avatar within a virtual world based on individualized data. Individual data may include activity history, as well as demographic data, of the avatar or of its associated user. This is distinguished from focusing rule definition and application as a function of collective behavior by a general population, in one aspect enabling individual customization and divergence from collective or aspirational norms on a much greater scale, and with fine-tuning to serve the needs of certain individual, unique avatars/users.

Customizing a rule in some examples comprises revising or setting an application threshold, thus specifying what activity or magnitude thereof will constitute a violation of the rule. In one embodiment customizing rule comprises revising a threshold of an extant behavior rule upward or downward in proportion to a difference of a current behavior observation value from a previous behavior observation value: for example, if a avatar is presently using even more offensive words (thereby violating an offensive word usage rule) than an amount used in a previous/historic event also violating the rule, then a threshold (e.g. three offensive words/five minutes) may be lowered (e.g. to one offensive word/five minutes) in order to trigger corrective appropriate action more quickly for this avatar, perhaps to provide additional encouragement to stop using offensive words.

Customizing a rule may also comprise revising or selecting an appropriate action specified for violating a rule. In one embodiment an appropriate action is revised as a function of a difference of a current behavior observation value from a previous behavior observation value: for example, referring again to the offensive word usage rule described above, where the avatar is presently using more offensive words than in a previous/historic event, rather than merely warning the avatar (an appropriate action for the previous rule violation) the current appropriate action may comprise interrupting a chat session to directly address the offending avatar and request a change in behavior. In another aspect comparing current and previous violation history may determine a pattern of consistent or increasing violating incidents, wherein other individual data indicates good or excellent behavior regarding other aspects of the avatar/user behavior. This may indicate a progressive relaxing of the rule requirements, thresholds or appropriate actions, in order to improve the VU experience of the otherwise well-behaved avatar and encourage his or her continued participation in the VU.

Individual and historic data may also include behavior data from other VU domains or regions by the same avatar or a user thereof, as well as data generated through observation of an avatar user's behavior in the real-world. Rule customization may also be performed responsive to demographics, thus in some examples resulting in different thresholds or different customized rules for different avatars with similar behavior and activity histories. Thus offensive word usage rules may be asserted more stringently against a first avatar of a youth user than against a second avatar of an adult user, even though the first and the second avatars may have similar offensive word usage history data.

Appropriate actions taken against an avatar for violating a customized rule may take a variety of forms, and may be selected dependent upon a history or status of the violating avatar. By analyzing the behavior of individual avatars, embodiments of the present invention may identify and select individual avatars that violate rules to a greater extent than a benchmark standard, for example greater than other rule violators of the community or collective will considered as a whole.

In some examples influential or important avatar may be treated more differentially, for example through different weighting of severity of behavior observations or corrective actions. Thus a famous, important or influential avatar may receive preferential rule customization relative to another less famous/important/influential avatar, for example receiving more permissive rule defining, thresholds or appropriate actions.

The present invention enables dynamic rule customization in response to the current, actual and observed behavior of an avatar. Thus by iteratively looping through the process illustrated in FIG. 1 and discussed above a rule may be iteratively refined and customized in an on-going basis, enabling the prevention of a drift of the customized rule away from a norm or expectation of an individual avatar as evidenced by his or her behavior, in one aspect avoiding dissatisfaction through imposing unnecessary or unmanageable rules as indicated by increasing or steady frequencies of violations. For example, a commercial region within a VU may have a rule stating that no avatar should be able to wear casual clothes, which may inconvenience or annoy a first avatar and keep him from entering the site, resulting in a loss of business opportunities. If, however, processes, methods and systems according to the present invention determine that the history of this avatar indicates a strong likelihood of a successful commercial transaction with the avatar, then the rule may be relaxed in its application to this specific avatar, for example automatically or by notifying an administrator of the region of a recommendation to relax the rule and admit the specific avatar.

Customization may also comprise comparing the avatar to behavior and demographic data from a collective or subset of avatars. The subset may be a predetermined sample set of avatars chosen as representative of one or more aspects of a VU domain or regional collective body of avatars, for example chosen based on a specific demographic criterion of an avatar such as location, age and other demographic data. In some embodiments the subset sample may be randomly chosen, for example "X" percent of the total where X is selected randomly.

In another aspect people who speak common languages, live within common geographic locations, have similar fashion sense, hobbies, etcetera, often have a natural affinity for or feel more comfortable dealing with those who share said attributes in real-world interpersonal interactions. They may also share norms with respect to behaviors that diverge from a more general population: for example, avatars who visit or reside within a VU region associated with alternative music may have a higher acceptance level for the use of some language, image or word usage than a general VU population, and accordingly rules may be defined specific to an alternative music region that allow higher levels of such language, image or word usage. VU region providers and other service providers may thus provide better and better-received services to selected avatars, adding interests and behavioral attributes in common with a collective or corporate body of the VU or region thereof, in one aspect leveraging common interpersonal communication tendencies and characteristics to define and provide automated customization of VU avatar engagement rules and norms. Customizing rules in response to demographic data may provide advantages in a number of virtual universe engagement contexts, including focusing preferential rule treatment on preferred customers to encourage sales, etc.

Subsets of collective avatars used for rule norms and baselines may be chosen at random from avatars having certain demographic and history data shared with the avatar or which may otherwise indicate that their data is relevant and useful in customizing the rule. For example, collective or subset avatars may be chosen or chosen from based on a number of violations of the same or similar rules in the past, or pursuant to historic data indicating a proclivity to relevant behavior (e.g. customizing a rule for an avatar with a history of using offensive words may comprise considering data from other high offensive word usage avatars to determine efficacy of an appropriate action associated with infraction of a current or proposed customized rule).

Individual data collection may encompass data generated from multiple types of avatar actions, for example through parsing avatar conversations, speech or movement to determine offensive communications or gestures, or inventory to determine possession of offensive items, and other appropriate data will be apparent to one skilled in the art. Data collection may be constant (e.g. in real time or on an ongoing basis) or it may be intermittent, for example acquired or sampled on-demand or at specific scheduled intervals. Collected data may be extrapolated to other avatars, including larger groups or even an entire population of a virtual world as a whole, in one respect enabling the setting of a collective norm baseline for the collective VU community as a whole.

Rule customization according to the present invention may be automated, or manually entered or confirmed. For example, a determination as provided above that an offensive word usage rule of "no more than three offensive words per five minutes" should be revised to "no more than one offensive word per five minutes" may be provided as a recommendation to a VU administrator, provider or other entity, in some examples by a service provider, through an e-mail, chat, alert dialog or other communication or notification means, wherein the actual revision must be manually entered or authorized by the notified entity.

Figure 2:
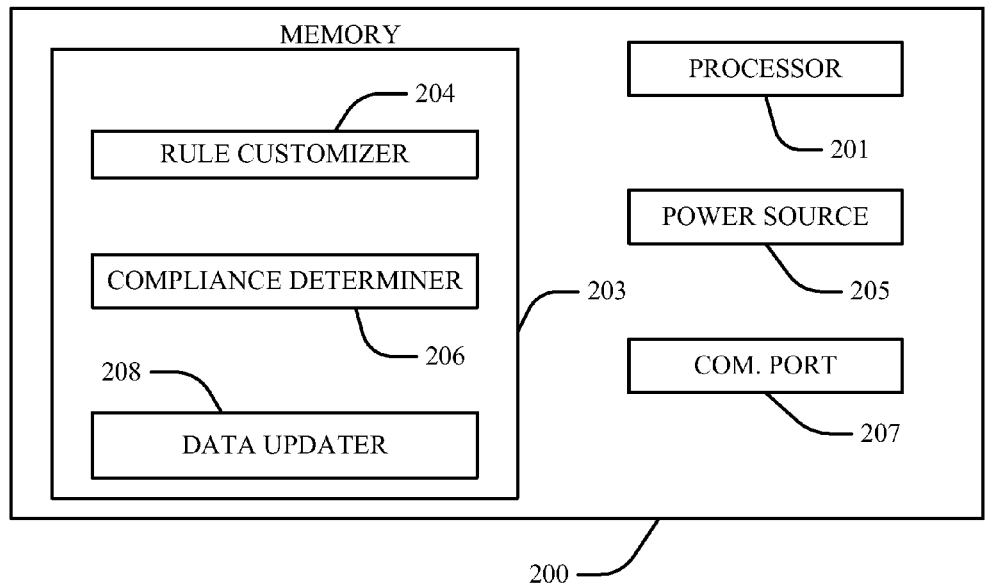
FIG. 2 is a block diagram illustration of a device configured to customize an avatar behavior rule within a virtual universe environment as a function of individual avatar data according to the present invention.

FIG. 2 illustrates a programmable device 200 configured to customize an avatar behavior rule within a virtual universe environment as a function of individual avatar data. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment comprises a central processing unit (CPU) or other processing means 201 in communication with a memory 203 comprising logic components that enable the CPU 201 to perform processes and methods according to the present application, as will be understood through reference to FIG. 1 as discussed above. Thus the memory 203 comprises a rule customizer logic component 204 enabling the processing means 201 to customize a rule for an avatar as a function of the avatar's individual data; a compliance determiner component 206 enabling the processing means 201 to determine if avatar behavior meets the customized rule and to responsively take an appropriate action; and an individual data updater 208 enabling the processing means 201 to update the avatar's individual data as a function of rule customizing and rule application as discussed above. However, it will be understood that in other embodiments one or more of the components 204, 206 and 208 may be omitted, and its functions or algorithms combined with others of the components 204, 206 and 208 or accomplished by other systems, components, elements or parties A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com. port") 207 is also provided and configured to enable data and other communications as may be appropriate.

II. Computerized Implementation

Figure 3:
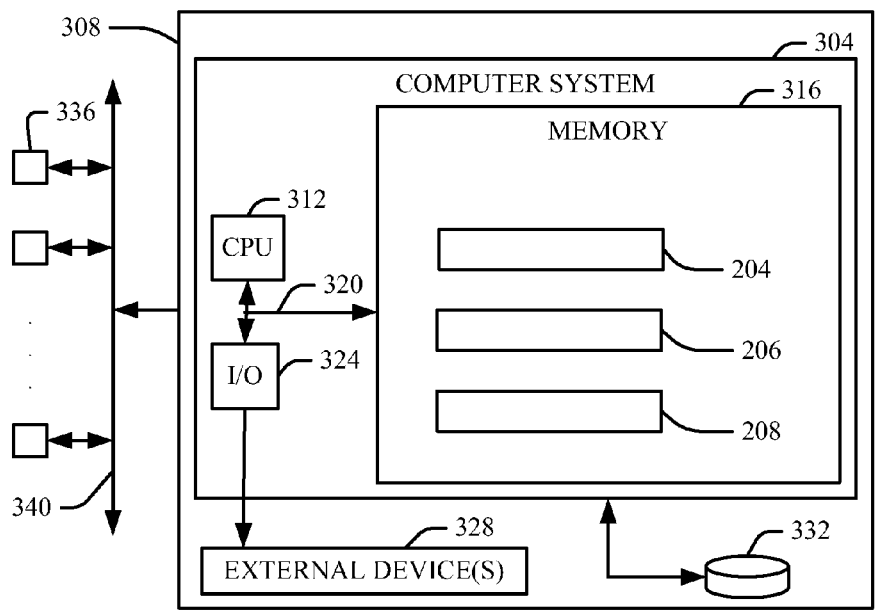
FIG. 3 is a block diagram illustrating an exemplary computerized implementation of a system and method for customizing an avatar behavior rule within a virtual universe environment as a function of individual avatar data according to the present invention.

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer or other programmable device. Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the present invention, including the methods, processes and devices/systems illustrated in the Figures and described herein, including the rule customizer logic component 204, the compliance determiner component 206 and the individual data updater 208, which are stored in memory 316 and/or storage system 332. It is to be appreciated that two or more, including all, of the components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. Moreover, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to practice an embodiment according to the present invention, including the methods, processes and devices/systems illustrated in the Figures and described herein. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal.

Still yet, computer infrastructure 308 is intended to demonstrate that some or all of the components of implementation could be deployed, managed, serviced, etc. by a service provider who offers to implement, deploy, and/or perform the functions of the present invention, including methods, processes and devices/systems according to the present invention as illustrated in the Figures and described herein, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the invention, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for customizing an avatar behavior rule within a virtual universe environment as a function of individual avatar data, comprising:
a processing unit determining an activity of an avatar of a user within a virtual universe violates an original threshold of a behavior rule for the virtual universe;
if the avatar activity is determined to violate the original threshold of the rule, the processing unit automatically:
customizing the rule for the avatar as a function of individual avatar data associated with the avatar to generate a revised threshold that is more permissive of the avatar activity than the original threshold, wherein some activities of the avatar that violate the original threshold do not violate the revised threshold;
determining whether the avatar activity exceeds the revised threshold of the customized rule; and
takes an appropriate action with respect to the avatar that is specified by the customized rule if the activity is determined to exceed the revised threshold;
the processing unit updating the individual avatar data as a function of at least one of the determining whether the activity violates the original threshold of the rule, the customizing the rule, the determining whether the activity exceeds the customized rule revised threshold, and the taking the appropriate action;
wherein the individual avatar data comprises at least one of:
a behavior history of the avatar;
a behavior history of a user associated with the avatar;
demographic data associated with the avatar; and
demographic data associated with the user;
wherein the original threshold is a specified rate of occurrence of a prohibited activity over time; and
wherein the generating the revised threshold comprises revising the specified rate of occurrence of the original threshold of the behavior rule upward if the individual avatar data indicates a history of good behavior regarding other aspects of behavior of the avatar.

2. The method of claim 1, further comprising:
Automatically customizing the rule by generating the revised threshold by weighting an amount of a required compliance of a behavior of the avatar that is specified by the original threshold to permit the determined activity, if the determined activity is not permitted by the original threshold and the individual avatar data indicates that the avatar has a preferential status to other avatars within the virtual universe.

3. The method of claim 1, further comprising:
determining a collective behavior norm from behavior observation data for each of a subset collective plurality of avatars that have demographic data in common with the individual avatar data demographic data associated with the avatar or the user; and
wherein the customizing the rule comprises using the determined collective behavior norm as the revised threshold.

4. The method of claim 1, further comprising:
determining a collective behavior norm from behavior observation data for each of a subset collective plurality of avatars that each have violated the original threshold of the rule in the past; and
wherein the step of customizing the rule by using the determined collective behavior norm as the revised threshold.

5. The method of claim 4, further comprising randomly selecting each avatar of the subset collective plurality of avatars.

6. The method of claim 4, further comprising:
selecting each avatar of the subset collective plurality of avatars by correlating the demographic data of the individual avatar data with demographic data of each of the subset collective of avatars.

7. The method of claim 1, further comprising:
integrating computer-readable program code into a computer system comprising the processing unit, a computer readable memory and a computer-readable tangible storage device, wherein the computer readable program code is embodied on the computer-readable tangible storage device and comprises instructions that, when executed by the processing unit via the computer readable memory, cause the processing unit to perform the steps of determining whether the avatar activity violates the original threshold of the behavior rule, automatically customizing the rule for the avatar as the function of individual avatar data associated to generate the revised threshold, determining whether the avatar activity exceeds the revised threshold of the customized rule; taking the appropriate action with respect to the avatar that is specified by the customized rule if the activity is determined to exceed the revised threshold, and updating the individual avatar data.

8. A system, comprising:
a processing unit in communication with a computer readable memory and a computer-readable storage medium;
wherein the processing unit, when executing program instructions stored on the computer-readable storage medium via the computer readable memory:
determines whether an activity of an avatar of a user within a virtual universe violates an original threshold of a behavior rule for the virtual universe;
if the avatar activity is determined to violate the original threshold of the rule, automatically:
customizes the rule for the avatar as a function of individual avatar data associated with the avatar to generate a revised threshold that is more permissive of the avatar activity than the original threshold, wherein some activities of the avatar that violate the original threshold do not violate the revised threshold;
determines whether the avatar activity exceeds the revised threshold of the customized rule; and
takes an appropriate action with respect to the avatar that is specified by the customized rule if the activity is determined to exceed the revised threshold;
updates the individual avatar data as a function of at least one of the determining whether the activity violates the original threshold of the rule, the customizing the rule, the determining whether the activity exceeds the customized rule revised threshold, and the taking the appropriate action;
wherein the individual avatar data comprises at least one of:
a behavior history of the avatar;
a behavior history of a user associated with the avatar;
demographic data associated with the avatar; and
demographic data associated with the user;
wherein the original threshold is a specified rate of occurrence of a prohibited activity over time; and
wherein the processing unit, when executing the program instructions stored on the computer-readable storage medium via the computer readable memory, generates the revised threshold by revising the specified rate of occurrence of the original threshold of the behavior rule upward if the individual avatar data indicates a history of good behavior regarding other aspects of behavior of the avatar.

9. The system of claim 8, wherein the processing unit, when executing the program instructions stored on the computer-readable storage medium via the computer readable memory, automatically generates the revised threshold by weighting an amount of a required compliance of a behavior of the avatar that is specified by the original threshold to permit the determined activity, if the determined activity is not permitted by the original threshold and the individual avatar data indicates that the avatar has a preferential status relative to other avatars within the virtual universe.

10. The system of claim 8, wherein the processing unit, when executing the program instructions stored on the computer-readable storage medium via the computer readable memory, determines a collective behavior norm from behavior observation data for each of a subset collective plurality of avatars that have demographic data in common with the individual avatar data demographic data associated with the avatar or the user; and
customizes the rule by using the determined collective behavior norm as the revised threshold.

11. The system of claim 8, wherein the processing unit, when executing the program instructions stored on the computer-readable storage medium via the computer readable memory, determines a collective behavior norm from behavior observation data for each of a subset collective plurality of avatars that each have violated the original threshold of the rule in the past; and
customizes the rule by using the determined collective behavior norm as the revised threshold.

12. An article of manufacture, comprising:
a computer-readable tangible storage device having computer readable program code embodied therewith, the computer readable program code comprising instructions that, when executed by a computer system processing unit, cause the processing unit to:
determine whether an activity of an avatar of a user within a virtual universe violates an original threshold of a behavior rule for the virtual universe;
if the avatar activity is determined to violate the original threshold of the rule, automatically:
customize the rule for the avatar as a function of individual avatar data associated with the avatar to generate a revised threshold that is more permissive of the avatar activity than the original threshold, wherein some activities of the avatar that violate the original threshold do not violate the revised threshold;
determine whether the avatar activity exceeds the revised threshold of the customized rule; and
take an appropriate action with respect to the avatar that is specified by the customized rule if the activity is determined to exceed the revised threshold; and
update the individual avatar data as a function of at least one of the determining whether the activity violates the original threshold of the rule, the customizing the rule, the determining whether the activity exceeds the customized rule revised threshold, and the taking the appropriate action;

wherein the individual avatar data comprises at least one of:

a behavior history of the avatar;

a behavior history of a user associated with the avatar;

demographic data associated with the avatar; and demographic data associated with the user;

wherein the original threshold is a specified rate of occurrence of a prohibited activity over time; and wherein the processing unit, when executing the program instructions stored on the computer-readable storage medium via the computer readable memory, generates the revised threshold by revising the specified rate of occurrence of the original threshold of the behavior rule upward if the individual avatar data indicates a history of good behavior regarding other aspects of behavior of the avatar.

13. The article of manufacture of claim 12, wherein the computer readable program code instructions, when executed by the processing unit, further cause the processing unit to automatically generate the revised threshold by weighting an amount of a required compliance of a behavior of the avatar that is specified by the original threshold to permit the determined activity, if the determined activity is not permitted by the original threshold and the individual avatar data indicates that the avatar has a preferential status relative to other avatars within the virtual universe.

14. The article of manufacture of claim 12, wherein the computer readable program code instructions, when executed by the processing unit, further cause the processing unit to determine a collective behavior norm from behavior observation data for each of a subset collective plurality of avatars that have demographic data in common with the individual avatar data demographic data associated with the avatar or the user; and customize the rule by using the determined collective behavior norm as the revised threshold.

15. The article of manufacture of claim 12, wherein the computer readable program code instructions, when executed by the processing unit, further cause the processing unit to determine a collective behavior norm from behavior observation data for each of a subset collective plurality of avatars that each have violated the original threshold of the rule in the past; and customize the rule by using the determined collective behavior norm as the revised threshold.

* * * * *